UNITED STATES PATENT OFFICE.

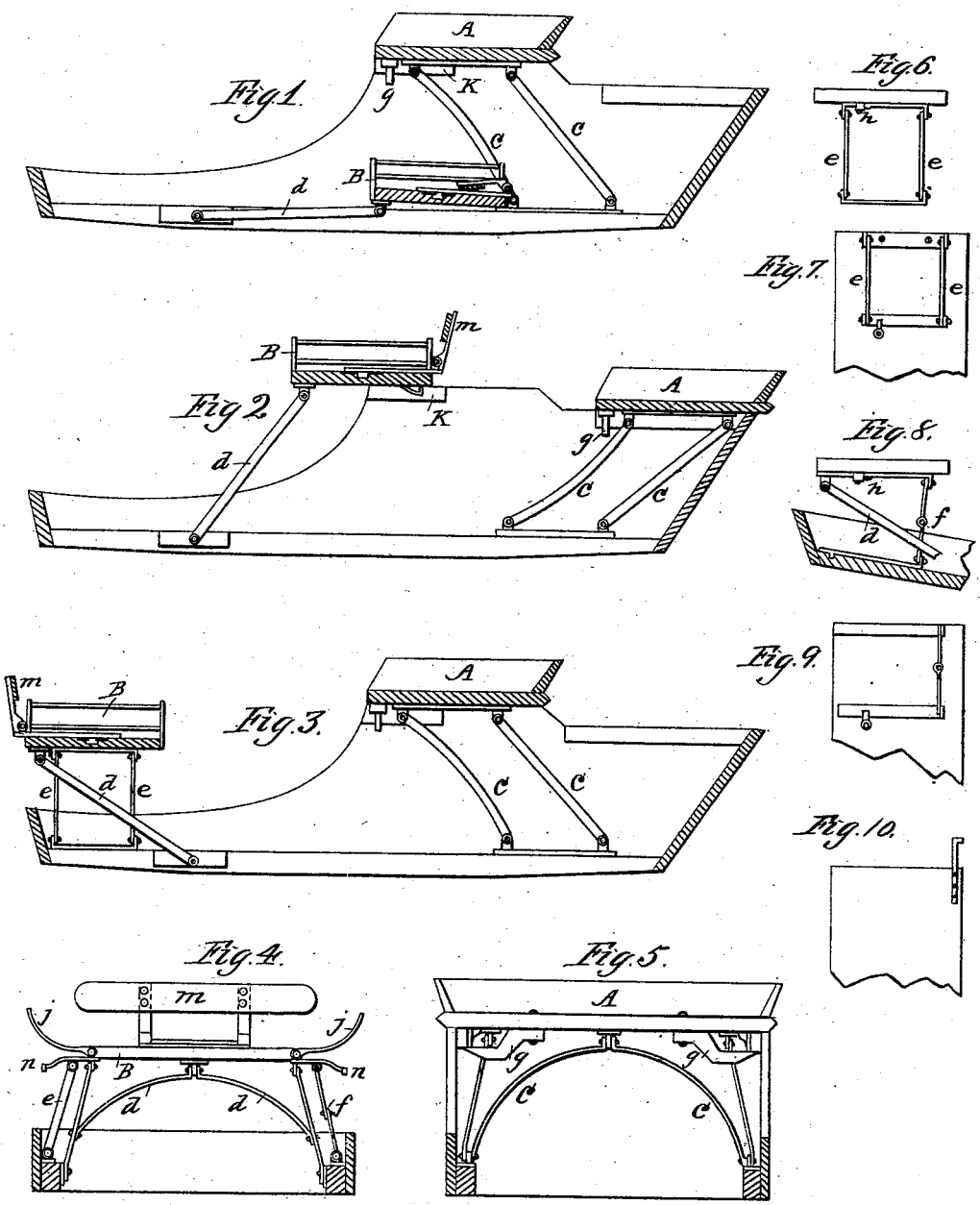

CHRISTIAN HAAS, OF CHICAGO, ILLINOIS.

CARRIAGE-SEAT.

SPECIFICATION forming part of Letters Patent No. 272,381, dated February 13, 1883.

Application filed August 26, 1880. (Model.)

*To all whom it may concern:*

Be it known that I, CHRISTIAN HAAS, of Chicago, in the county of Cook and State of Illinois, have invented certain new and useful Improvements in Seats for Buggies and other Similar Vehicles; and I herewith declare the following to be a true and accurate description thereof, reference being had to the accompanying drawings, and to the letters of reference marked thereon.

This invention relates to jump-seats for buggies; and it consists in certain improvements therein, as hereinafter described and claimed.

In the drawings, Figure 1 represents a longitudinal vertical section of a buggy-box with the seats arranged to be used as a single-seated buggy; Fig. 2, a similar section as arranged for a double-seated buggy; Fig. 3, a similar view again, with the front seat arranged to be occupied by children. Fig. 4 represents a transverse vertical section, showing the front seat; Fig. 5, a similar view of the rear seat. Fig. 6 shows a detached side elevation of the front-seat supports when extended; Fig. 7, a bottom view of a portion of the front seat with the supports folded under it; Fig. 8, the arrangement of the braces and supports for the front seat when applied to a buggy-box having an inclined front; Fig. 9, a bottom view of a portion of the front seat for a buggy having an inclined front, with its supports folded under it; and Fig. 10 represents an end stud as attached to the front seat.

Corresponding letters in the several figures of the drawings designate like parts.

A denotes the rear seat, pivotally coupled by two sets of braces, *c*, to the floor of the buggy-box in a manner that such seat is held parallel with such floor, and can be swung forward and backward to occupy an extreme rear or a more central position on the buggy-box, and to rest in either position on the side rails of the box. These braces *c* consist each set of a central bow-piece and of two uprights, and both sets are hinged at the top end to three longitudinal plates that are secured under the seat, and at their bottom ends to two plates, which are made rigid with the side floor-beams of the buggy-box. Underneath each end of the seat A is pivotally secured a hook, *g*, which can be turned under the side rails K of the buggy-box for locking the seat in either one of its two positions.

B is the front seat, the front edge of which is pivotally connected by one set of braces, *d*, to the floor of the buggy-box. This brace *d* is of similar construction as the braces *c* of seat A, and will permit such seat to be folded down under seat A upon the floor of the buggy-box, or to be turned upward toward either direction. This seat B has two projecting studs, *n*, one to each end, which, when such seat B is turned upward to occupy the position shown in Fig. 2, will enter angular grooves or notches in the top rail of the buggy-box, will support the rear portion of the seat, and will resist the stress of the angular pivotal braces *d*, which support the front edge of seat B. The seat B may also be turned to take the position in the forward end of the buggy-box as shown in Fig. 3, when intended to be occupied by children; and for this purpose I secure two frames, Figs. 6 and 7—one under each end of the seat—on which such seat B is supported upon the buggy-box floor. The standards *e* of these frames are pivotally connected with two cross-bars, the upper one of which is made rigid with the seat in a manner that such frames will fold under the seat toward each other, and can be locked thereto by turn-buttons *h* whenever such seat is to be supported on the railing of the buggy-box or is to be folded inside the buggy-box. The lower cross-bars that connect standards *e* have dowel-pins, which enter sockets in the floor of the buggy-box for firmly holding such supports in position.

For buggies having an inclined front I connect a single standard, *f*, to the rear, under each end of seat B, which is pivotally coupled to top and bottom plates, as shown in Figs. 8 and 9. The top plates I secure rigidly under the seat, and to their forward ends I form the connecting-joints with the brace *d*. The lower plates I provide with dowel-pins that will enter sockets in the side sills of the buggy-body floor, upon which they rest, and the standards *f*, I form each of two sections hinged together, that these standards can accommodate themselves to the angle of the front inclination of the buggy-box. These standards *f* are to be straightened out again for folding them under the seat. In this manner the front seat is very substantially supported in front by the braces *d* and in rear by the standards *f*. The back *m* of the front seat is hinged to a plate, which, by a bolt or stud, is pivotally secured upon the center of the front seat, so as to be reversible for sitting on such seat in either direction. Whenever the seat B is to be folded under seat A, the back *m* is folded flat upon it. The side rails, *j*, forming extensions of seat B, are pivotally connected to near the ends of such seat B, and when extended they rest upon lugs on the ends of the seat. These extension-rails can be turned upon the seat B, so as to clear the buggy-box and to allow the seat B to be folded therein and under seat A.

As will be noticed, with the above simple arrangement, the position of the seats can be varied to suit all emergencies. The desired alteration can be made quick, and the seats will be always well braced and securely held in place.

The shape and construction of the braces and standards may be changed to suit different vehicles, and therefore I do not wish to be restricted to the particular arrangement herein described and shown.

I am aware that it is not new to support vehicle-seats upon pivotal braces, in order that the position of such seats may be changed from the front to the rear of the vehicle or folded down thereon, as desired.

I am also aware that it is not new to construct seats with folding backs, and I am further aware that it is not broadly new to lock vehicle-seats in position by means of a pivoted lever or catch, and I lay no claim thereto; but

What I claim is—

1. A jump-seat for vehicles, connected to the vehicle-floor by two pivotal braces, each consisting of a central bow-piece and two uprights, both sets being hinged at the top end to longitudinal plates secured under the seat, and at their bottom ends to plates rigid with the side floor-beams, and a turn-button or hook, *g*, pivoted underneath each end of the seat and adapted to turn under the side rails, substantially as and for the purpose set forth.

2. The front seat of a vehicle, pivotally connected to the floor of the vehicle-box at its front edge by a brace or braces, *d*, consisting of a central bow-piece, and two uprights hinged at their tops to longitudinal plates secured under the seat, and at their bottom end to plates rigid with the floor-beams, and having a projecting stud, *n*, at each end, pivotal standards *e*, and turn-buttons *h*, substantially as and for the purpose set forth.

3. A jump-seat for vehicles, connected to the floor by upright braces pivotally secured at their lower ends to plates rigid with the side floor-beams, and at their upper ends to longitudinal plates secured under the seat, and by a central bow-piece secured at its center to the seat, and rigidly connected at its lower ends to the upright braces for the purpose of affording a steady support to the seat while in position, and allowing of its readily being folded or turned when desired, substantially as set forth.

CHRISTIAN HAAS.

Witnesses:
MAX SONNENSCHEIN,
ISAAC J. FRANKLIN.